(12) United States Patent
Edlinger et al.

(10) Patent No.: US 7,515,343 B2
(45) Date of Patent: Apr. 7, 2009

(54) SYSTEM FOR PROJECTING AN IMAGE USING NARROW BAND LIGHT SOURCES

(75) Inventors: Johannes Edlinger, Frastanz (AT); Claus Heine-Kempkens, Chur (CH)

(73) Assignee: Oerlikon Trading AG, Trubbach, Trubbach (LI)

( * ) Notice: Subject to any disclaimer, the term of this patent is extended or adjusted under 35 U.S.C. 154(b) by 0 days.

(21) Appl. No.: 11/419,664

(22) Filed: May 22, 2006

(65) Prior Publication Data
US 2006/0197923 A1 Sep. 7, 2006

Related U.S. Application Data

(63) Continuation of application No. 10/369,374, filed on Feb. 19, 2003, now Pat. No. 7,057,822.

(51) Int. Cl.
*G02B 27/10* (2006.01)
(52) U.S. Cl. .................. 359/629; 359/634; 359/563; 362/236; 362/242; 362/230; 362/231
(58) Field of Classification Search .......... 359/563, 359/629, 634; 362/230, 231, 236, 242
See application file for complete search history.

(56) References Cited

U.S. PATENT DOCUMENTS

| | | | |
|---|---|---|---|
| 5,181,054 A | 1/1993 | Nicolas | |
| 5,497,207 A | 3/1996 | Kim | |
| 6,109,752 A | 8/2000 | Itoh et al. | |
| 6,288,844 B1 | 9/2001 | Edlinger | |
| 6,336,724 B1 | 1/2002 | Shouji et al. | |
| 6,398,389 B1* | 6/2002 | Bohler et al. | 362/293 |
| 6,411,425 B1 | 6/2002 | Kowarz | |
| 6,547,421 B2* | 4/2003 | Sugano | 362/268 |
| 6,561,654 B2* | 5/2003 | Mukawa et al. | 353/31 |
| 6,623,122 B1 | 9/2003 | Yamazaki | |

FOREIGN PATENT DOCUMENTS

EP 0 938 014 A1 8/1999

OTHER PUBLICATIONS

Patent Abstract of Japan, vol. 1997, No. 01, Jan. 31, 1997 & JP 08 248417 A (Fuji Photo Optical Co Ltd), Sep. 27, 1996 abstract.

* cited by examiner

*Primary Examiner*—Joseph Martinez
(74) *Attorney, Agent, or Firm*—Pearne & Gordon LLP

(57) ABSTRACT

The invention provides an image projection system including a first light source and a second light source. Light from the first light source is limited to a finite number of limited wavelength intervals. An imaging device is adapted for modulating light from the first and second light sources. A beam combiner is provided to combine light from the light sources and direct the combined light to the imaging device. Modulated light from the imaging device is directed to a lens.

7 Claims, 4 Drawing Sheets

US 7,515,343 B2

SYSTEM FOR PROJECTING AN IMAGE USING NARROW BAND LIGHT SOURCES

BACKGROUND OF THE INVENTION

This invention relates to an image projection device using narrow-band light sources and reflective spatial light modulators.

Various projectors use reflective imaging elements, such as reflective spatial light modulators based on the principle of localized polarization modulation. For example, many systems use liquid crystal on silicon (LCOS) devices. Polarization modulation may be converted to intensity modulation using a polarization beam splitter positioned in the optical path in front of the imaging element.

Where the projector uses three imaging elements, for example, for red, blue, and green light respectively, it is possible to position a polarization beam splitter directly in front of each imaging element. An X-cube (as described in U.S. Pat. No. 5,122,217) may then be used to recombine the three colored beams.

In another approach, where three imaging elements are also used, the polarization-modulated beams are first recombined. Conversion of polarization to intensity modulation is then based on just one polarization beam splitter.

FIG. 1 is a schematic representation of such a projector. A light source 21 emits white, non-polarized light W. This enters the polarization beam splitter 5 where a polarization beam splitting interface 17 reflects light Ws polarized in a first polarization state out of the system. Light Wp polarized in a second polarization state and orthogonally to Ws, is transmitted to an imaging device 1. The imaging device 1 includes a wavelength-selective beam splitter 3, hereafter referred to as an X-cube, and three imaging elements 7, 9, 11. The X-cube 3 splits white light polarized in the Wp plane into its red, green, and blue components and reflects/transmits them towards the respective imaging elements 7, 9, 11. The imaging elements 7, 9, 11 reflect virtually all of the incident light. Depending on local conditions at a given point on the imaging element, light emerges with its polarization either unchanged, rotated 90°, or something in-between. The reflected light is combined in the X-cube 3.

The light component having unchanged polarization after reflection propagates from the imaging device 1 to the polarization beam splitter 5, is transmitted through the polarization beam splitter and returns to the light source 21. The light component with rotated polarization propagates from the imaging device to the polarization beam splitting interface 17 of the polarization beam splitter 5, which reflects the light component toward a projection lens 19 and hence to a projection screen 23. The result is a color image on the projection screen.

Wavelength-selective dielectric layer systems (referred to as color filters 13, 15) are commonly deployed in the X-cube 3. These color filters are, in general, strongly polarization-dependent. On one hand, this impairs efficiency and hence the achievable image brightness. In addition, stray light can undergo multiple, largely uncontrolled reflections within the system and may reach the projection screen, where it degrades image contrast or produces ghost images.

There are known at least two approaches for reducing this problem: a) Polarization dependency in the color filters 13, 15 can be reduced by selecting a substrate with a low refractive index in combination with highly refractive layers. b) Tilting the X-cube 3 with respect to the otherwise centered beam path results in differing angles of incidence before and after reflection, which compensates for the polarization dependence. Although these techniques help to preserve intensity, there is still considerable light loss and the achievable image contrast remains unacceptably low.

This is largely attributable to phase retardation (often referred to as phase shift) introduced by the color filters 13, 15. On transmission or reflection through a system of dielectric layers, the s-polarized and p-polarized light components generally undergo differing amounts of phase retardation. A linear-polarized beam containing both components is elliptically polarized after transmission or reflection by the layer system, so it becomes impossible to cleanly separate the polarizations for representing image information. Geometrical observations show that when a cone of light illuminates the polarization beam splitter 5, the light arriving at color filter 15 always contains both polarization components, while it is quite possible that just one polarization component is present at color filter 13.

Literature describes attempts at optimizing the necessary layer systems to minimize phase retardation as far as possible. However, this is very difficult to achieve. There are generally large and hard-to-control oscillations in phase and hence phase retardation, particularly at the edges of the color filter.

Other approaches attempt to compensate for the phase retardation in-duced in the color filter by means of an additional, spectrally neutral coated interface. However, this entails additional interfaces, which enlarge the system and increase production expense.

It would be desirable to have a projector that utilizes a high proportion of the intensity provided by the light source, while avoiding the phase retardations that are responsible for ghost images and degraded contrast.

BRIEF SUMMARY OF THE INVENTION

The invention provides an image projection system including a first light source and a second light source. Light from the first light source is limited to a finite number of limited wavelength intervals. An imaging device is adapted for modulating light from the first and second light sources. A beam combiner is provided to combine light from the light sources and direct the combined light to the imaging device. Modulated light from the imaging device is directed to a lens.

The invention also provides a method of projecting an image. Light is transmitted from first and second light sources. Light from the first light source is limited to a finite number of limited wavelength intervals. Light from the light sources is combined and directed to an imaging device. The imaging device modulates light from the first and second light sources. Modulated light from the imaging device is directed to a lens.

DETAILED DESCRIPTION OF THE INVENTION

Figure 1:
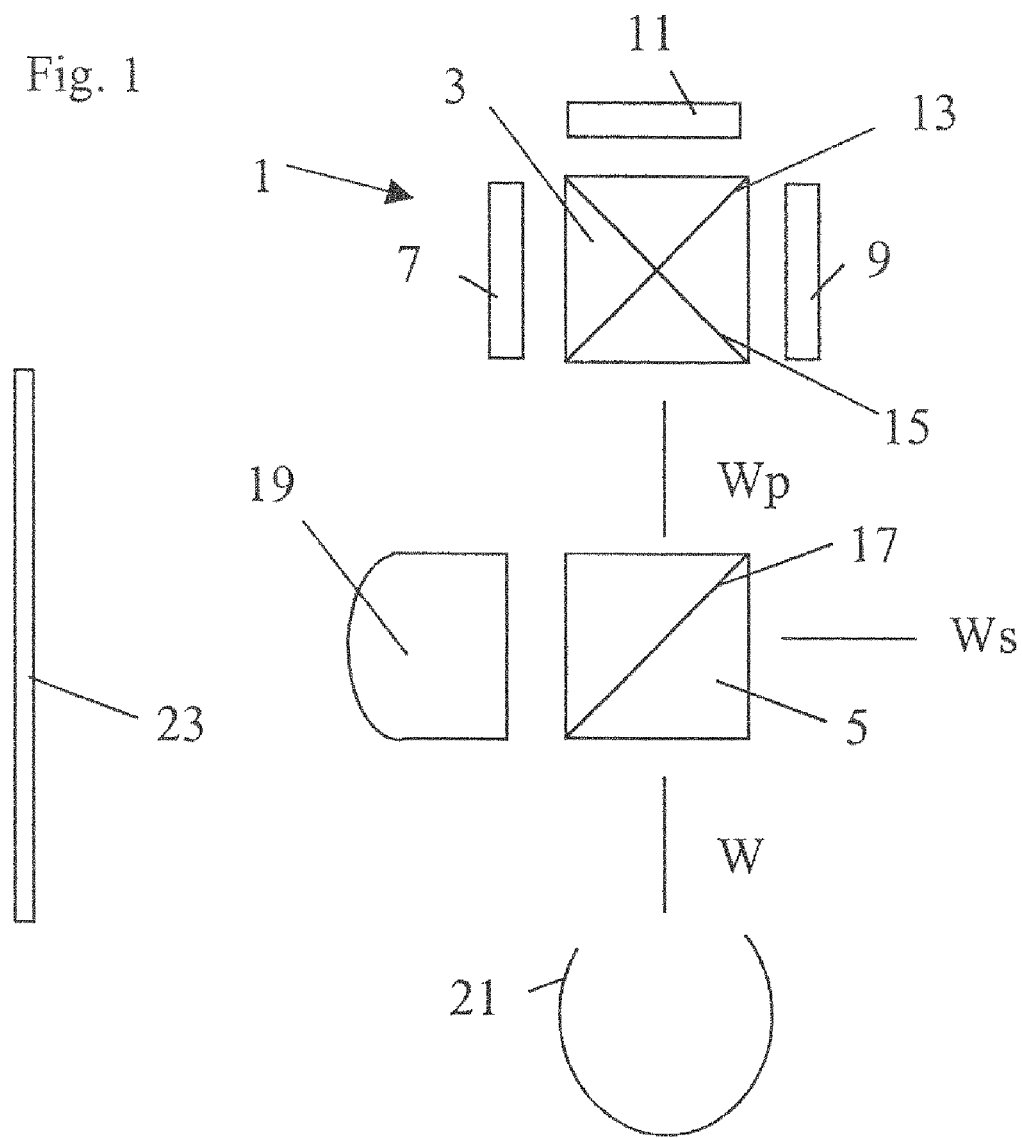
FIG. 1 shows a schematic drawing of a prior art projection device.
Figure 2:
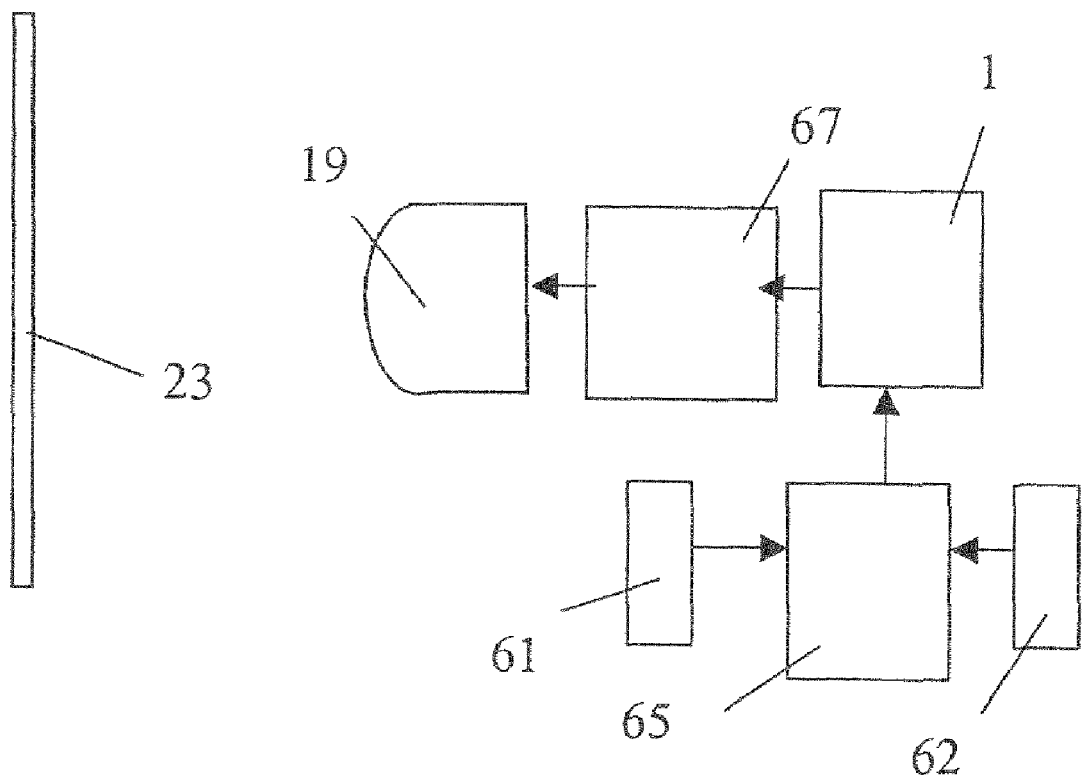
FIG. 2 shows a schematic drawing of a system according to the invention.

Referring to FIG. 2 an image projection system includes an imaging device 1. The imaging device is adapted for modulating a characteristic of light. Preferably, the characteristic is the intensity of the light or a characteristic that can be converted to intensity. For example, the imaging device can be adapted for modulating the polarization of the light, which can be converted to intensity modulation of the light. Thus the intensity of the light can be modulated dependent on the modulated polarization of the light. The imaging device 1 can, for example, include an X-cube and three imaging elements as discussed above. Alternatively, the imaging device 1 can include a single imaging element.

The system also includes at least two light sources 61, 62. Light from at least one of the light sources 62 is limited to a finite number of limited wavelength intervals. That is, the light is frequency band limited. This can be accomplished, for example, by using a narrow-band light source, such as one or more light emitting diodes (LEDs) or lasers including, in particular, laser diodes. Preferably, the light sources emit light in non-overlapping wavelength intervals which are, for example, limited to a width of less than 100 nm. In most cases a width of less than 50 nm is suitable. Sources having interval widths of 20 nm or smaller can also be used. A trim filter or filters can be used to further limit the wavelength interval of the light source.

Light from the light sources 61, 62 is combined in a beam combiner 65. The beam combiner 65 can be, for example, an X-cube or a diffraction grating. The beam combiner 65 directs the combined light to the imaging device 1. The imaging device 1 modulates the light from the beam combiner 65. The imaging device can, for example, modulate light in different wavelength bands simultaneously or sequentially using a single or multiple imaging elements, as discussed elsewhere herein.

Modulated light from the imaging device is directed to a lens 19 and projected on a screen 23. As a result of the light modulation performed by the imaging device 1, the imaging device can produce a beam having two components each component having a different modulation state. A beam splitter 67 can be disposed between the imaging device and the lens 19 to separate the two components and transmit one of the two components to the lens 19. The beam splitter 67 and the beam combiner 65 can be a single device; examples of this are discussed below.

Figure 3:
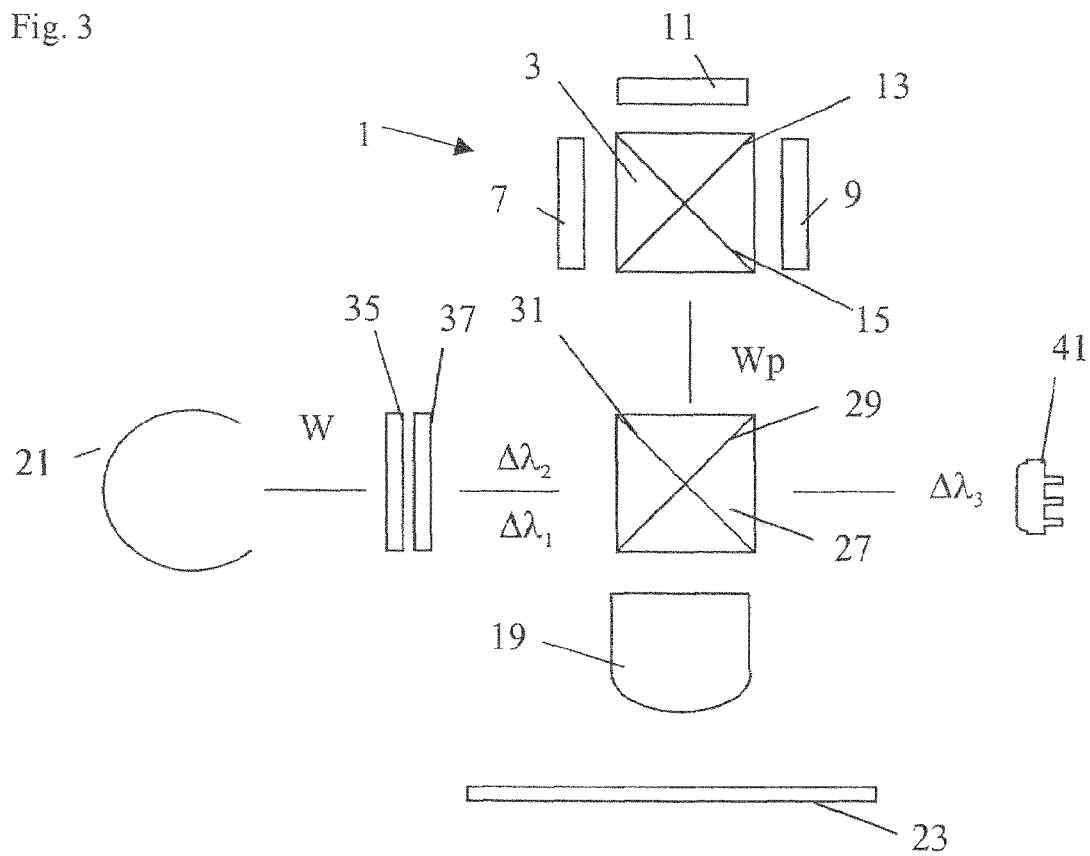
FIG. 3 shows a schematic drawing of an embodiment of the present invention using a white light source and an additional narrow-band light source.

In one example of implementing of the invention, shown in FIG. 3, a first light source is a narrow-band light source 41 and a second light source is a conventional light source, such as a white light source 21. When one of the light sources (21 in this example) is a white light or other broad-band light source, a filter can be used to limit the wavelength interval so that it does not overlap with the wavelength interval of the narrow-band light source 41. For example, a color filter 35 filters out the red component of the light emitted by the white light source 21 and also filters out parts of the blue and green components of the light emitted by the white light source that are not to be used for projection. The only light transmitted falls within a first wavelength interval $\Delta\lambda 1$, for example, a band of blue light, and a second wavelength interval $\Delta\lambda 2$, for example, a band of green light. This light is polarized by an optical element 37, which can be, for example, a simple polarizer, a polarizing beam splitter, or a polarization conversion system. Linear polarized light in the first and second wave intervals $\Delta\lambda 1$, $\Delta\lambda 2$ enters a polarizing dichroic cube 27. At a reflective interface 29 of the cube 27, the light is reflected toward the X-cube 3.

The narrow-band light source 41 is an auxiliary light source that emits light within the third wavelength interval $\Delta\lambda 3$, for example, a band of red light. The third wavelength interval light $\Delta\lambda 3$ is directed toward the polarizing dichroic cube 27, which combines the light $\Delta\lambda 3$ with the first wavelength interval light $\Delta\lambda 1$ and the second wavelength interval light $\Delta\lambda 2$. In one type of imaging device, as described above, the light is split into three spectral bands in X-cube 3, polarization-modulated and reflected at the respective imaging elements 7, 9, 11, then recombined in a beam combiner, which, in this example is the X-cube 3. Polarization-modulated white light re-enters the polarizing dichroic cube 27. Interfaces 29 and 31 of the cube 27 transmit all p-polarized light to the projection lens 19 while reflecting all s-polarized light away from the projection lens. The image is then projected on the screen 23.

Figure 4:
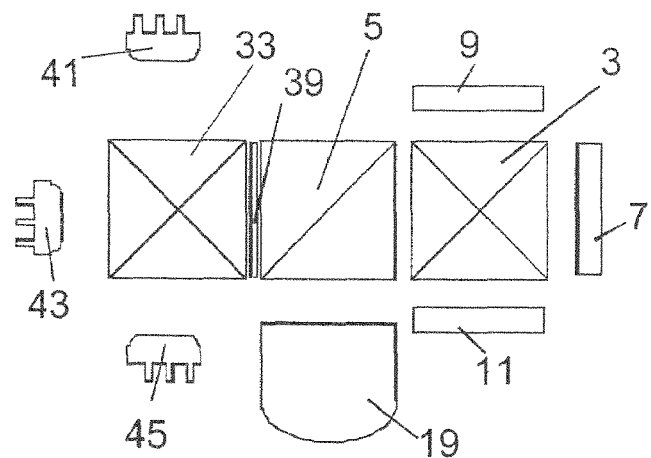
FIG. 4 shows a schematic drawing of an embodiment of the present invention using three narrow-band light sources.

In a further implementation example, shown in FIG. 4, a first narrow-band light source 41 emits light within the first wavelength interval $\Delta\lambda 1$. A second narrow-band light source 43 emits light within the second wavelength interval $\Delta\lambda 2$, while a third narrow-band light source 45 emits light within the wavelength interval $\Delta\lambda 3$. An additional X-cube 33 combines the light from the light sources and transmits the light via a polarization beam splitter 5. Between the additional X-cube 33 and the polarizing beam splitter 5 a wavelength selective retarder 39 can be inserted to adjust the polarizations of the light to be s-polarized with respect to the polarization beam splitter 5. A light component having unchanged polarization after reflection propagates from the imaging device 1 to the polarization beam splitter 5 and is transmitted through the polarization beam. A light component with rotated polarization propagates from the imaging device to a polarization beam splitting interface of the polarization beam splitter 5, which reflects the light component toward a projection lens 19 The technology for producing a screen image from the X-cube 3, imaging elements 7, 9, 11, and the lens 19 has been described above.

Figure 5:
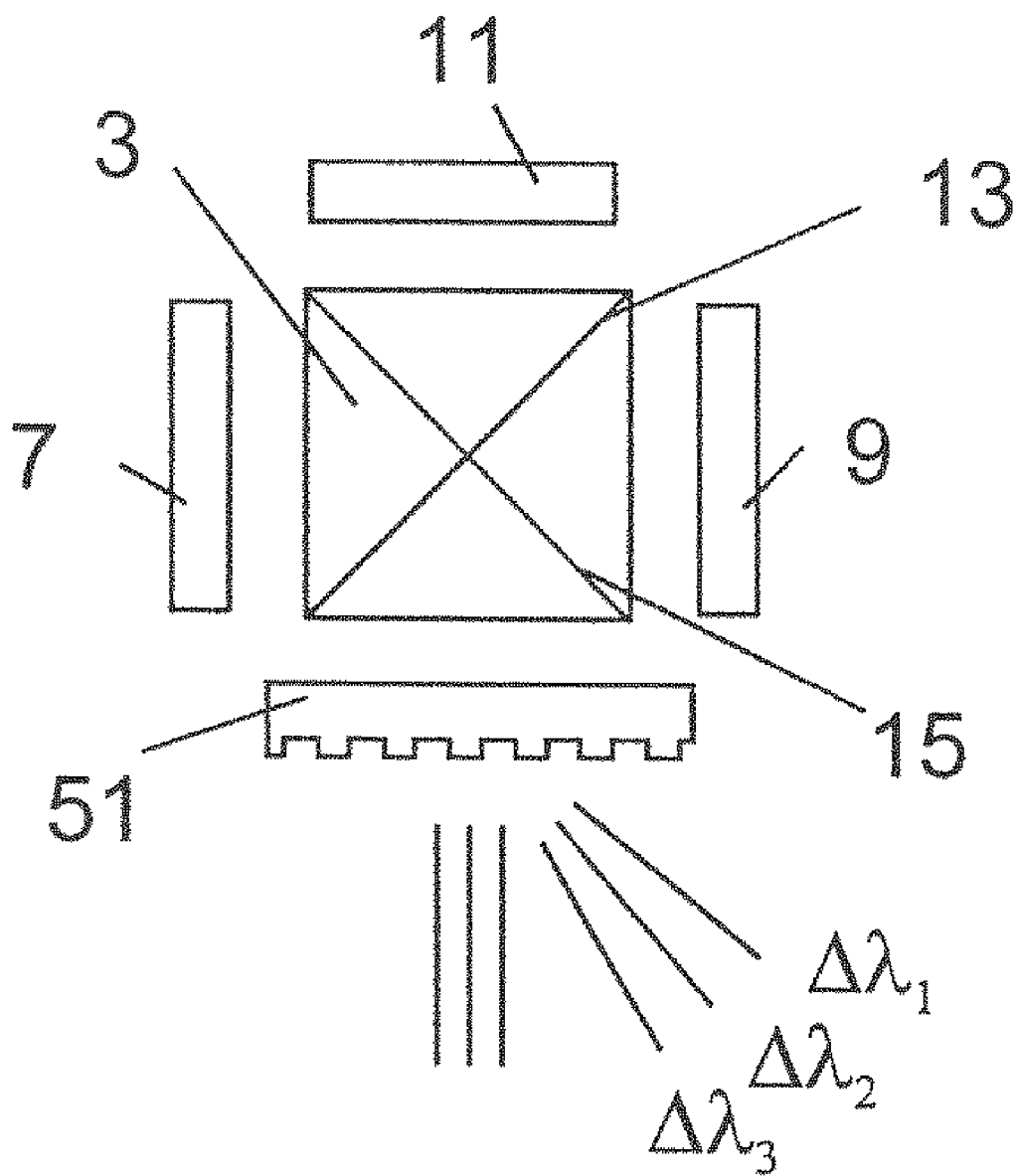
FIG. 5 shows a schematic drawing of an embodiment of the present invention using a diffractive beam splitter.

In a further implementation example, shown in FIG. 5, a diffractive optical element 51 is used to combine light having three narrow wavelength intervals $\Delta\lambda 1$, $\Delta\lambda 2$, $\Delta\lambda 3$ from three light sources (not shown). The principle of the diffractive optical element 51 is based on higher order diffraction. There would be particular benefit in deploying a first-order optical diffraction grating, for example, in the light path to the imaging device including the X-cube 3 and the imaging elements 7, 9, 11. The diffractive optical element 51 could be a grating and exhibits diffractive properties in only one of the two polarization planes. The diffractive optical element 51 can also convert polarization-modulated light from the imaging device into intensity-modulated light for projection by the lens (not shown). Incident light is directed towards the grating under an angle of first order diffraction and after modulation and recombination in the X-cube 3 passes the grating at an angle of zero order diffraction towards the projection lens. Dammann gratings can be designed in such a way that they show the required optical behavior for the diffractive optical element 51. Similar structures could be used as well in higher diffraction orders. For narrow-band light sources as used in projectors according to the present invention, fabrication of such diffractive optical devices is practicable.

What is claimed is:

1. An image projection system comprising:
   a first light source, wherein light from the first light source is limited to a finite number of limited wavelength intervals;

a second light source, wherein the first light and second light sources emit light in non-overlapping wavelength intervals;
an imaging device adapted for modulating light from the first and second light sources;
a diffractive optical element to combine light from the light sources and direct the combined light to the imaging device; and
a lens, wherein modulated light from the imaging device is directed to the lens,
wherein light from the light sources is polarized and the imaging device comprises at least one polarization modulator and further comprising means to transmit light at an intensity dependent on polarization of the light disposed between the imaging device and the lens.

2. An image projection system comprising:
a first light source, wherein light from the first light source is limited to a finite number of limited wavelength intervals;
a second light source;
an imaging device adapted for modulating light from the first and second light sources;
a diffractive optical element to combine light from the light sources and direct the combined light to the imaging device; and
a lens, wherein modulated light from the imaging device is directed to the lens,
wherein light from the light sources is polarized and the imaging device comprises at least one polarization modulator and further comprising means to transmit light at an intensity dependent on polarization of the light disposed between the imaging device and the lens, and
wherein the means to transmit is the diffractive optical element.

3. The system according to claim 2 wherein the diffractive optical element is a first-order diffraction grating.

4. An image projection system comprising:
a first light source, wherein light from the first light source is limited to a finite number of limited wavelength intervals;
a second light source, wherein the first light and second light sources emit light in non-overlapping wavelength intervals;
an imaging device adapted for modulating light from the first and second light sources;
a diffractive optical element to combine light from the light sources and direct the combined light to the imaging device; and
a lens, wherein modulated light from the imaging device is directed to the lens,
wherein the diffractive optical element is a first-order diffraction grating.

5. A method of projecting an image comprising the steps of:
transmitting light from first and second light sources;
limiting light from the first light source to a finite number of limited wavelength intervals;
a diffractive optical element combining light from the light sources;
directing the combined light to an imaging device;
the imaging device modulating light from the first and second light sources;
directing modulated light from the imaging device to a lens; and
directing the modulated light through the diffractive optical element before the step of directing the modulated light to the lens.

6. The method according to claim 5 wherein the step of modulating the light comprises polarization modulating the light and further comprising the step of the diffractive optical element converting the polarization-modulated light to intensity-modulated light.

7. A method of projecting an image comprising the steps of:
transmitting light from first and second light sources in non-overlapping wavelength intervals;
limiting light from the first light source to a finite number of limited wavelength intervals;
a diffractive optical element combining light from the light sources;
directing the combined light to an imaging device;
the imaging device modulating light from the first and second light sources; and
directing modulated light from the imaging device to a lens,
wherein the step of modulating the light comprises polarization modulating the light and further comprising the step of converting the polarization-modulated light to intensity-modulated light.

* * * * *